TAPE RECORDER APPARATUS

Filed March 11, 1960 7 Sheets-Sheet 1

Inventor.
Sheldon Lee Pastor.
By. Zabel, Baker, York, Jones & Dithmar
Attorneys.

Nov. 16, 1965 S. L. PASTOR 3,218,397

TAPE RECORDER APPARATUS

Filed March 11, 1960 7 Sheets-Sheet 2

Inventor:
Sheldon Lee Pastor.
By. Zabel, Baker, York, Jones & Dithmar
Attorneys.

Nov. 16, 1965 S. L. PASTOR 3,218,397

TAPE RECORDER APPARATUS

Filed March 11, 1960 7 Sheets-Sheet 3

Inventor.
Sheldon Lee Pastor.

By. Zabel, Baker, York, Jones & Dithmar
Attorneys.

Nov. 16, 1965 S. L. PASTOR 3,218,397

TAPE RECORDER APPARATUS

Filed March 11, 1960 7 Sheets-Sheet 4

Inventor.
Sheldon Lee Pastor.
By. Zabel, Baker, York, Jones & Dithmar
Attorneys.

Nov. 16, 1965 S. L. PASTOR 3,218,397

TAPE RECORDER APPARATUS

Filed March 11, 1960 7 Sheets-Sheet 5

Inventor.
Sheldon Lee Pastor.
By. Zabel, Baker, York, Jones & Dithmar
Attorneys.

TAPE RECORDER APPARATUS

Filed March 11, 1960

Inventor
Sheldon Lee Pastor.

By. Zabel, Baker, York, Jones & Dithmar
Attorneys.

Nov. 16, 1965 S. L. PASTOR 3,218,397

TAPE RECORDER APPARATUS

Filed March 11, 1960 7 Sheets-Sheet 7

Inventor.
Sheldon Lee Pastor.

By. Zabel, Baker, York, Jones & Dithmar
Attorneys.

United States Patent Office 3,218,397
Patented Nov. 16, 1965

3,218,397
TAPE RECORDER APPARATUS

Sheldon Lee Pastor, Chicago, Ill., assignor, by mesne assignments, to Minnesota Mining and Manufacturing Company, St. Paul, Minn., a corporation of Delaware Filed Mar. 11, 1960, Ser. No. 14,255
34 Claims. (Cl. 179—100.2)

This invention relates to tape recorder apparatus, and more particularly to improved and novel control mechanisms for such apparatus.

The present tape recorder apparatus is designed both to record signals on a magnetic recording medium and to reproduce or play signals recorded previously. While magnetic tape is illustrated and described as the recording medium, various features of the invention may be used in apparatus designed for recording and reproducing with magnetic wire.

Some of the structural features here illustrated and described are shown in prior U.S. Patent Nos. 2,785,892, 2,877,958, 2,907,190 and copending U.S. application Serial No. 712,440 now Patent No. 2,942,875 filed January 31, 1958, all owned by the assignee of the present application.

This invention contemplates tape recorder apparatus which is provided with improved control mechanisms designed to simplify operation of the recorder and to afford various novel control features.

One object of the invention is to provide tape recorder apparatus wherein the principal functions of the recorder are under the control of manually depressible keys, and wherein only minimum manual energy is required to actuate the keys. In general, the energy required to actuate any of the keys is comparable to that required for a spring switch, i.e., a "feather touch." As will be seen, the user merely triggers a control key, and the apparatus itself supplies the additional energy required to shift the mechanism into the desired function. This feature enables some of the functions to be controlled remotely.

Another object is to provide tape recorder apparatus having a backspace control which facilitates indexing the tape and use of the instrument as a dictating and transcribing machine. This control is more or less separate from the other principal controls and is subject to actuation during stop condition of the apparatus or during operation of the apparatus in either the record or play function.

Another object of the invention is to provide tape recorder apparatus wherein the play, record and stop functions may be controlled, at least in part, from remote locations such as a microphone, a foot pedal, or a control located at a nearby typewriter.

Still another object is to provide tape recorder apparatus having improved means for turning itself off automatically when the tape on the supply reel is exhausted.

Another object is to provide tape recorder apparatus which is capable of rewinding the tape automatically from any predetermined point on the tape, usually the point where the tape on the supply reel is nearly exhausted.

Another object is to provide tape recorder apparatus capable of automatic rewind, as mentioned above, which also is capable either of turning the apparatus off at the conclusion of automatic rewind, or of replaying the tape automatically. This latter feature enables continuous play of the tape for an indefinite period, for example all day, if desired. The automatic rewind feature and the automatic turnoff when the rewind is completed are of particular advantage with stereo tapes.

The respective controls, as previously mentioned, are characterized by the small amount of manual effort required to operate them. In most instances only a feather touch is required. The controls act fast, silently and positively. It virtually is impossible to operate the controls in improper or damaging sequence.

Other objects, advantages and details of the invention will be apparent as the description proceeds, reference being had to the accompanying drawings wherein one form of the invention is shown. It will be understood that the description and drawings are illustrative only, and that the scope of the invention is to be measured by the appended claims.

*General description of controls*

Before describing the illustrated tape recorder apparatus and its control mechanism in detail, it will be helpful first to refer to the various controls in a general way. The actuating elements of the various controls are shown for the most part in FIG. 1, and other control elements are shown in the schematic diagram, FIG. 11.

Figure 1:
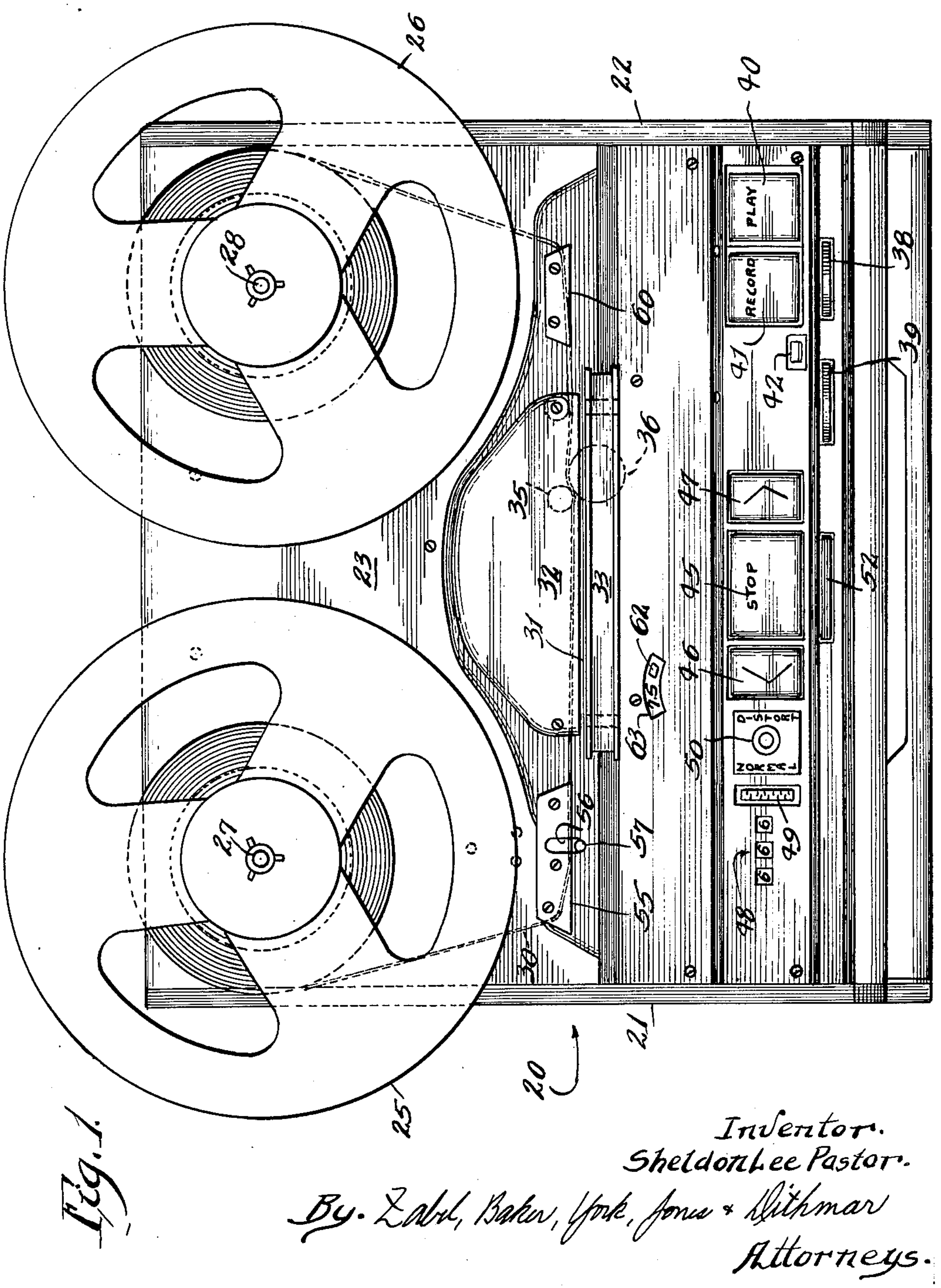
FIG. 1 is a top plan view of tape recorder apparatus embodying the invention, and showing tape reels and tape mounted for operation in the apparatus.

Referring first to FIG. 1, the illustrated tape recorder apparatus is generally designated 20. It includes a suitable case having sides 21 and 22 and an operating deck 23. A supply reel 25 and a take-up reel 26 are carried respectively by spindles 27 and 28 at the rear of deck 23. Magnetic tape 30 is shown on both reels together with a length extending between the two reels. A tape threading slot is defined by cover 32 of the sound head and a spaced member 33 mounted on deck 23.

Tape 30 is driven across the sound head during the play and record functions of the apparatus by means of a capstan 35 which rotates at highly uniform speed and a cooperating idler pressure roller 36. Capstan 35 and pressure roller 36 are shown in tape-driving relation in FIG. 1.

In the form of the invention illustrated, the recorder is turned on and off by actuating a circular knob 38, a peripheral portion of which extends through an opening in deck 23 at the right front (FIG. 1). This knob also adjusts the tone control for the amplifier of the apparatus. The amplifier volume is controlled by adjacent knob 39.

The apparatus is shifted into the play function by means of depressible play key 40, and is shiftable into the record function by means of adjacent depressible record key 41. As will be seen later, controls are provided for interrupting and resuming the play and record functions from remote locations, if desired.

An upstanding control lever 42 protrudes through an opening in deck 23 adjacent record key 41. This lever 42 has two control functions. First, actuation thereof is effective to stop tape travel instantly when the tape is being driven in the play or record functions. Second, lever 42 serves as a record interlock, that is, the lever must be actuated to allow record key 41 to be depressed. The latter feature avoids accidental erasure of signals on the tape by requiring a conscious act before it is possible to depress the record key.

A depressible stop key 45 is located centrally of the front portion of deck 23. When depressed, stop key 45 terminates the function in which the apparatus then is operating and shifts the mechanism to stop condition. Key 45 is effective to stop all tape transport functions of the apparatus, although other control means are provided which also will stop some of the functions, as will be seen.

Depressible rewind key 46 is located at the left of stop key 45. Actuation of key 46 shifts the tape transport mechanism into the rapid rewind function.

Depressible rapid forward key 47 is located at the right of stop key 45. Actuation of this key shifts the tape transport mechanism into forward drive for cueing the tape rapidly.

A conventional counter 48 for indexing the tape is located at the left front of deck 23, and an adjacent knob 49 is provided to zero the counter. A recording level indicator 50 is located between knob 49 and rewind key 46. When recording, volume knob 39 is set to provide a level which produces illumination in one-half only of indicator 50, as is well known.

Depressible backspace key 52 is located immediately in front of stop key 45. As will be seen, backspace key 52 may be actuated effectively only when the apparatus is in stop condition or is operating in the play or record function. When the apparatus is in the play function, actuation of backspace key 52 does three things. First, forward tape travel is stopped instantly by separating pressure roller 36 from capstan 35. Second, and simultaneously, the apparatus is shifted into rapid rewind and the tape is driven in rewind as long as key 52 is held depressed. Third, upon release of key 52, rewind drive is terminated with suitable braking of the tape and, following a short automatic time delay to permit deceleration, the tape again resumes forward drive in the play function.

Still referring to backspace key 52, when the apparatus is in the record function, actuation of key 52 also does three things. First, when key 52 is depressed, tape drive is stopped instantly. Second, and simultaneously, the control mechanism is shifted to stop condition and the tape is driven in rapid rewind during the period key 52 is held depressed. Third, when key 52 is released, the backspace function concludes with the mechanism in stop condition. Thereafter, play key 40 must be depressed to ascertain the precise portion of the tape then in the sound head.

A guide post 55 for tape 30 is positioned on deck 23 forwardly of supply reel 25. Post 55 and the deck below has a slot 56, and an arm 57, pivoted below deck 23, is movable into and out of the slot. Arm 57 is the actuating element of a switch which is connected in series with the off-on line switch actuated by knob 38.

As shown in FIG. 1, the threaded tape 30 lies between arm 57 and post 55, thereby holding arm 57 in switch-closed position. In this condition of the switch, power from the line is turned on and off by knob 38. When either end of tape 30 runs out from between arm 57 and post 55, arm 57, which is biased toward slot 56, enters the slot and thus opens the associated line switch, thereby turning off the entire apparatus automatically. Post 55 also functions to provide the aforesaid automatic repeat feature, and will sometimes be referred to as the repeat post.

A second guide post 60 for tape 30 is located on deck 23 in front of take-up reel 26. This post, as will be seen, cooperates to provide the previously mentioned automatic rewind feature. Accordingly, it sometimes will be referred to as the rewind post.

The upper portion of rewind post 60 includes two spaced switch terminals which, when automatic rewind is desired, are bridged by a conducting tab secured to the upper portion of tape 30 at the point where automatic rewind is to start. In the case of a tape having an automatic rewind tab, and automatic rewind is not desired for some reason, the tape simply is threaded behind rewind post 60. This inactivates the switch of post 60.

Repeat post 57 also includes two spaced switch terminals, and these terminals are located in the lower portion of the post. When automatic replay or repeat is desired, these terminals are bridged by a conducting tab secured to the lower portion of the tape at the point where replay is to start. When a repeat tab is present, and it is desired to avoid automatic repeat in a given instance, the effect of the tab can be overridden by depressing rewind key 46.

The switch terminals of rewind and repeat posts 60 and 57 are respectively on the upper and lower portions of the posts so the correspondingly located conducting tabs on tape 30 may actuate only the desired switch. Also, when the tape is inverted to use the second track, the tabs for the first track are effective to provide automatic rewind and repeat for the second track.

Completing the general description of the control elements shown in FIG. 1, speed-setting arm 62 extends upwardly through an arcuate slot 63 in deck 23. The illustrated apparatus is designed for two-speed tape travel, namely 3.75 inches per second or 7.5 inches per second. Arm 62, as illustrated, is positioned for 7.5 inches per second operation. It is movable to the left to condition the apparatus for operation at 3.75 inches per second.

*Mechanism providing feather-touch action of play, record and stop keys*

Figure 2:
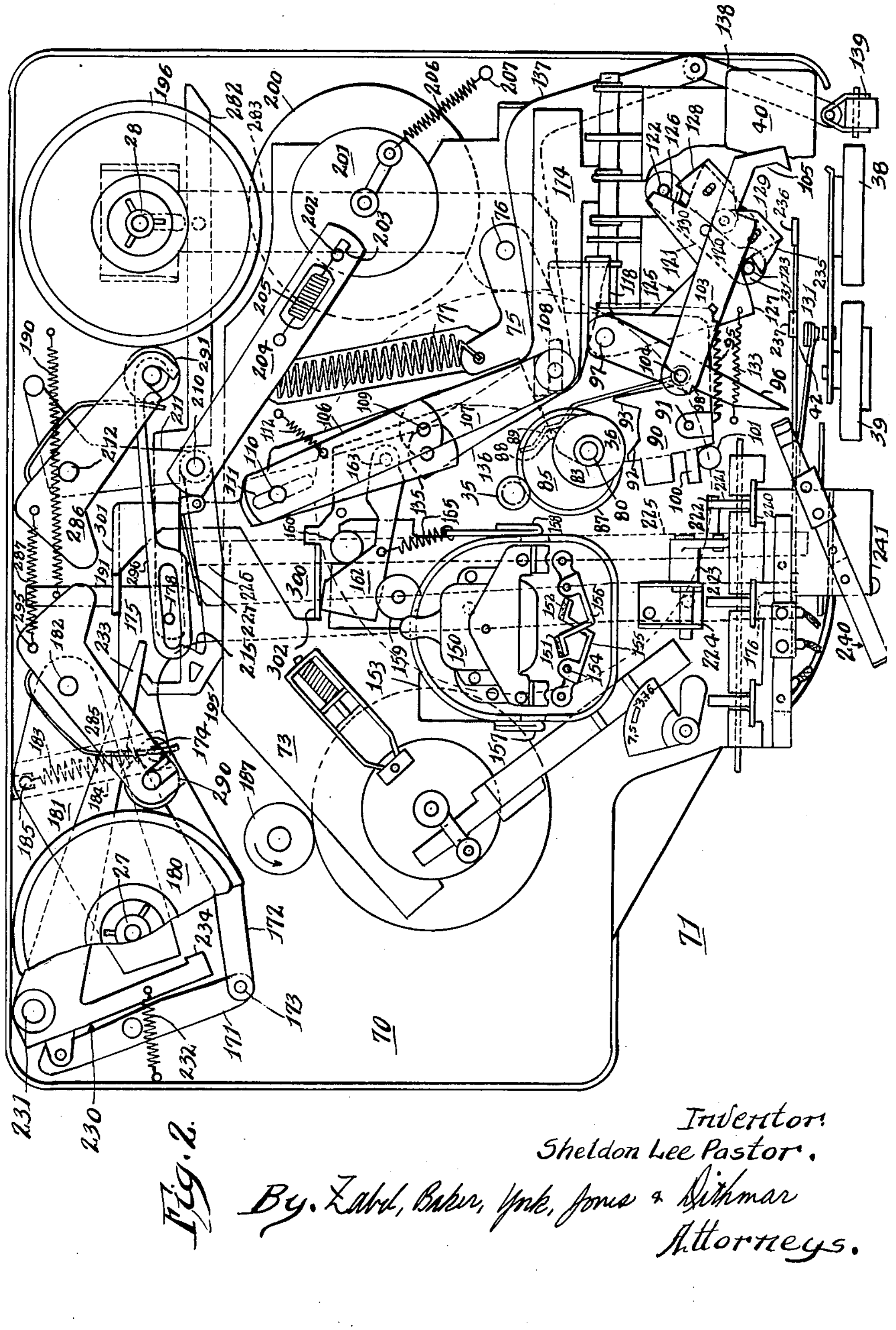
FIG. 2 is a top plan view of the apparatus with the case removed to show operating mechanism of the apparatus. In this figure the mechanism is illustrated in "stop" condition.
Figure 4:
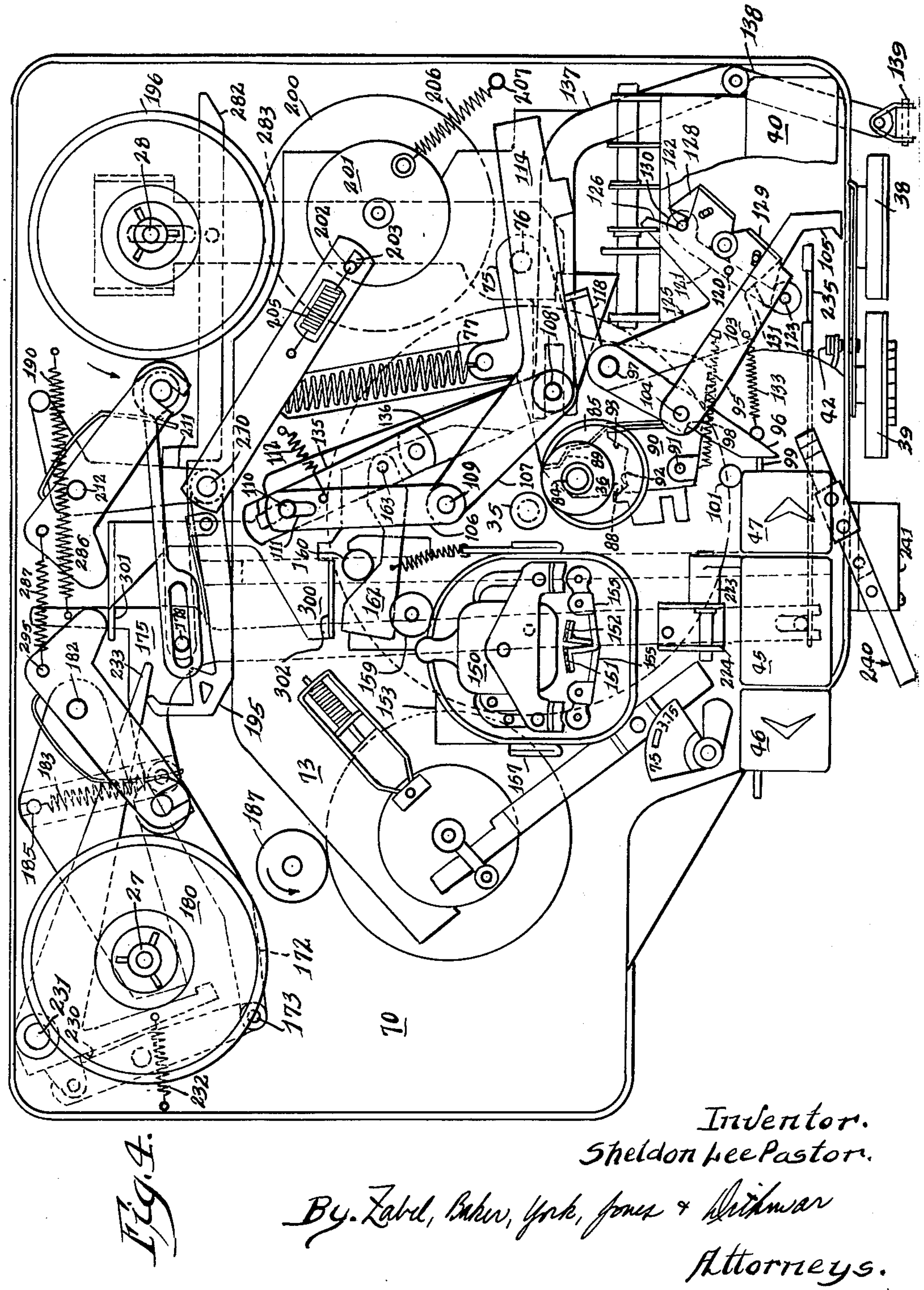
FIG. 4 is a view generally similar to FIGS. 2 and 3 but showing the mechanism in "record instant stop" condition.
Figure 5:
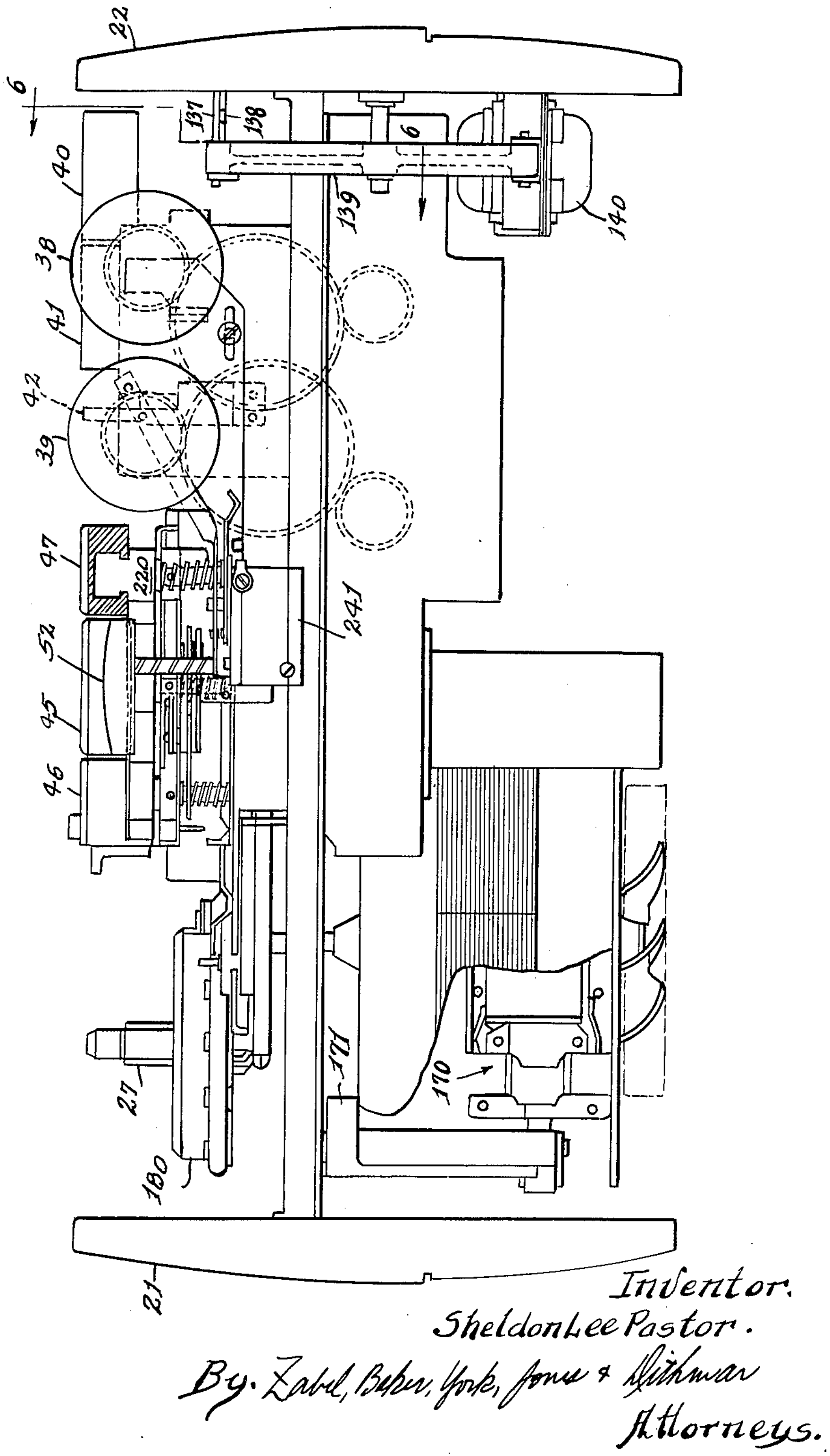
FIG. 5 is a front elevational view of the apparatus with case portions removed.
Figures 6, 7, 8, 9, 10:
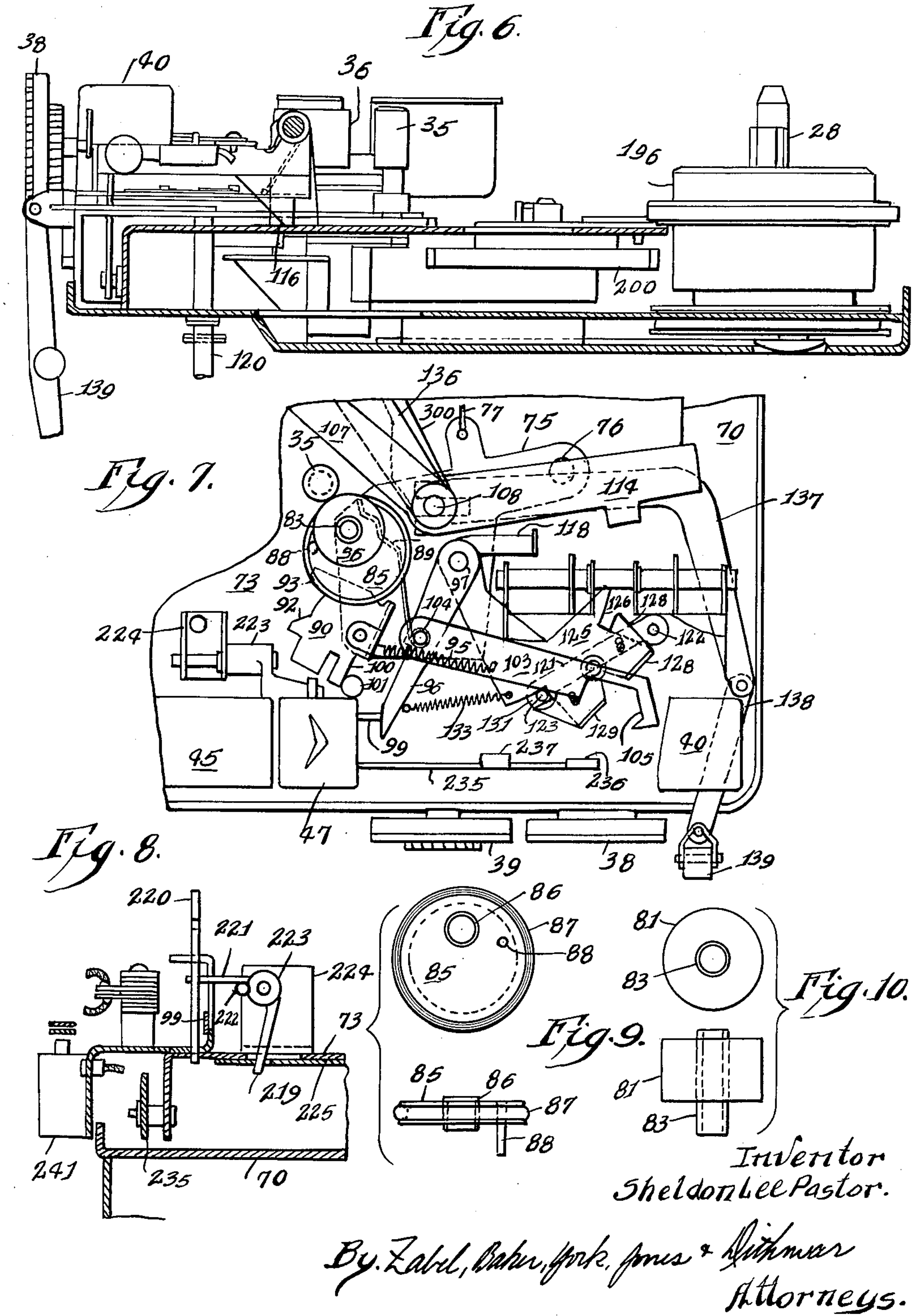
FIG. 6 is a sectional view on line 6—6 of FIG. 5.
FIG. 7 is an enlarged fragmentary plan view showing certain control mechanism in the positions occupied in shifting from the "play" function to "stop" condition.
FIG. 8 is a sectional view on line 8—8 of FIG. 3.
FIG. 9 shows a top plan view and a side elevational view of a cam roller element used in the invention.
FIG. 10 shows a top plan view and a side elevational view of the pressure roller element used in the invention.

This mechanism, together with other mechanisms of the invention, is shown in FIGS. 2–10 of the drawings. FIG. 2 shows the control elements of the mechanism in stop condition, FIG. 3 in play function and FIG. 4 in record instant stop condition. FIG. 7 shows the positions of certain control elements as they are in the process of shifting from play function to stop condition.

Referring to FIG. 2, the tape transport mechanisms are mounted on and above a chassis 70 which is more or less coextensive with the apparatus case. Chassis 70 is recessed in the region designated 71 to accommodate a speaker (not shown). A support 73, shown as a mounting plate, is disposed above chassis 70 in general parallelism therewith. Support 73 is coextensive with the front, central portion of chassis 70.

A generally L-shaped plate 75 is pivoted at its right hand end on upstanding stud 76 of support 73. Pivoted plate 75 is biased in clockwise direction by spring 77 connected between plate 75 and support 73. This pivoted plate, a basic element of the present control mechanism, is hereinafter sometimes referred to as the first means of the control mechanism.

A stud 80 extends upwardly from pivoted plate 75, and journalled thereon is idler pressure roller 36. As shown in FIG. 2 (stop condition), pressure roller 36 is in spaced relation with associated tape-driving capstan 35, but in other conditions of the mechanism (FIGS. 1 and 3), pressure roller 36 is in tape-driving engagement with capstan 35 under the biasing influence of spring 77. Pressure roller 36 is formed or has a periphery of resilient material such as rubber, and has a central bearing 83 of the sleeve type which fits over stud 80. Bearing 83 projects below roller 36 (FIG. 10) and engages plate 75 so that the roller is spaced somewhat above plate 75.

A cam roller 85, circular in shape, is mounted for eccentric rotation on pressure roller bearing 83 between pressure roller 36 and plate 75. Bearing 83 extends through a sleeve bearing 86 (FIG. 9) which is located eccentrically in cam roller 85. The periphery of cam roller 85 consists of resilient material which may take the form of a replaceable rubber tire 87. Cam roller 85, also a basic element of the present control mechanism, hereinafter sometimes is referred to as the second means of the control mechanism.

The general function of eccentric cam roller 85 is to engage the continuously rotating capstan 35 at selected times and to be rotated thereby when in such engagement. Rotation of cam roller 85 is effective to perform either of two major functions. First, if pivoted plate 75 is in its counterclockwise position as shown in FIG. 2 (stop condition), engagement of eccentric cam roller 85 and capstan 35 (with consequent rotation of cam roller 85) causes plate 75 to pivot in clockwise direction toward capstan 35 in a controlled, relatively slow manner. In this way pressure roller 36 is brought into gentle engagement with capstan 35 under the influence of bias spring 77 which otherwise would produce abrupt, noisy engagement. This engagement starts tape travel in the play or record function.

Second, if the mechanism is in the play or record function with pivoted plate 75 in clockwise position, eccentric cam roller 85, when moved into engagement with captan 35, is of course rotated. As a result, plate 75 is pivoted in counterclockwise direction away from capstan 35 and toward and into the position shown in FIG. 2. Such movement of plate 75 is in opposition to the force of bias spring 77, and it withdraws pressure roller 36 from capstan 35, thereby stopping tape travel.

From the foregoing, it will be seen that eccentric cam roller 85 (the second means) is the element which derives energy from capstan 35 and enables the mechanism to move gently and positively back and forth between the play or record function and stop condition. Other elements, next to be described, cooperate with plate 75 and accentric cam roller 85 in effecting these control functions.

A pin 88, best shown in FIG. 9, extends downwardly from cam roller 85 near its periphery. The precise location of pin 88 also is governed by reference to bearing 86. Pin 88 extends into effective relation with a positioning spring 89 which is mounted on plate 75. Pin 88 and spring 89 hereinafter are sometimes referred to as the fifth means of the control mechanism.

When the control mechanism is shifted into stop condition from the play or record function by actuation of stop key 45 (sometimes called the fourth means of the control mechanism), cam roller 85, as will be seen, is moved into engagement with capstan 35. The latter rotates cam roller 85 to the position shown in FIG. 2, and thus pivots plate 75 in counterclockwise direction, as previously described, to a latched position. At this time pin 88 is positioned adjacent spring 89 (FIG. 2), and the latter constitutes a stop which, if necessary, restrains further rotation of cam roller 85, it being understood that plate 75 at this time is latched so cam roller 85 no longer is biased against the driven by capstan 35.

When either play key 40 or record key 41 (collectively sometimes referred to as the third means of the control mechanism) is depressed, plate 75 is unlatched, as will be seen, whereby cam roller 85 under influence of spring 77 is moved through an extremely short free-travel distance into engagement with capstan 35. As capstan 35 rotates cam roller 85, pin 88 causes spring 89 to yield, and pin 88 travels beyond the previously mentioned stop established by the spring. Cam roller 85 is driven during a portion of its rotation at this point by the frictional relationship betwen its eccentric bearing 86 (FIG. 9) and rotating sleeve bearing 83 of pressure roller 36. Pin 88 next is stopped by an element which now will be described, one purpose of the element being to keep cam roller 85 out of engagement with capstan 35 until such time as engagement is desired for shifting the mechanism into stop condition.

The element last referred to is irregularly shaped latch plate 90 which is pivoted on stud 91 carried by plate 75. Latch plate 90 has a front finger 92 and a rear finger 93 which cooperate, as will be seen, with pin 88 of cam roller 85. As above mentioned, when the mechanism is shifted into play or record function, pin 88 moves beyond spring 89 and is stopped by engagement with front finger 92 of latch plate 90. Thus, cam roller 85 is stopped in a position where its periphery is closely adjacent to but out of contact with capstan 35. Latch plate 90 hereinafter sometimes is called the sixth means of the control mechanism.

When stop key 45 is depressed, latch plate 90 is permitted to rotate in counterclockwise direction, as will be seen, thereby moving front finger 92 out of engagement with pin 88 and bringing rear finger 93 into accelerated engagement with pin 88. This positively moves cam roller 85 against capstan 35 whereby the shift into stop condition is accomplished as previously described.

Latch plate 90 is biased in counterclockwise direction by spring 95. A latched position of plate 90 is established by keeper 96 which is pivoted on stud 97 carried by plate 75. Latch plate 90 and keeper 96 have cooperating shoulders at 98, and when the shoulders are engaged as shown (FIG. 2) spring 95 is unable to rotate plate 90 on its stud 91.

Figure 3:
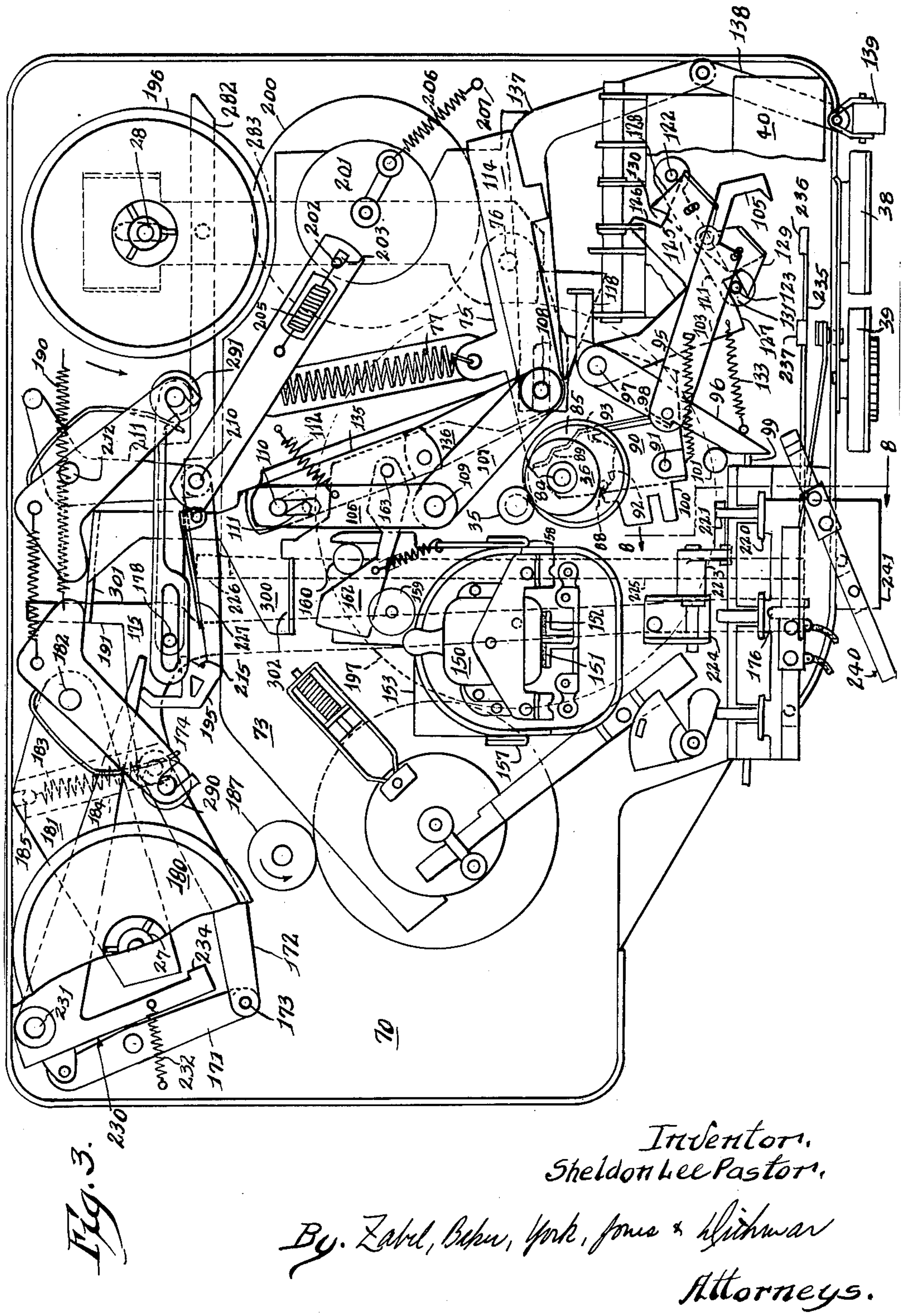
FIG. 3 is a view similar to FIG. 2 but showing the mechanism in "play" function which for the most part is same as for the "record" function.

Referring briefly to FIG. 3 (mechanism in play function), it will be seen that in play function cam roller pin 88 is in engagement with forward finger 92 of latch plate 90, and that plate 90 is latched by keeper 96. The free forward end of keeper 96 lies adjacent the end of a sliding bar 99 which moves to the right when stop key 45 (or rewind key 46 or rapid forward key 47) is depressed. As bar 99 is moved to the right in response to key action, keeper 96 is unlatched from plate 90. This permits spring 95 to rotate latch plate 90 in counterclockwise direction, thereby withdrawing front finger 92 from pin 88 and at the same time bringing rear finger 93 into accelerated engagement with pin 88, as previously mentioned. This latter engagement positively rotates cam roller 85 into contact with capstan 35 so the latter drives the former and causes the mechanism to shift to stop condition.

After latch plate 90 has been rotated to perform the above function, it is necessary to relatch the plate 90 and keeper 96. This is accomplished by engagement between edge 100 of latch plate 90 and a stud 101 carried by support 73. The aforesaid engagement occurs as plate 75 is moved counterclockwise into stop position (FIG. 7).

An arm 103 is pivoted at 104 to keeper 96. Its free end 105 may be moved to the right to separate keeper 96 from plate 90 in response to an alternative control and thus bring about the shift to stop condition. This alternative control, incidentally, is the backspace mechanism which when actuated during the record function shifts plate 75 and related elements to stop condition, as will be seen.

Main pivoted plate 75 is latched or locked in counterclockwise position (stop condition) in opposition to the bias of spring 77 by means of the upper knuckle assembly of two superimposed knuckle assemblies. Upper knuckle assembly comprises rear link 106 and front lever 107. Front lever 107 has a generally L-shape, and at the juncture of its legs is pivoted on stud 108 carried by plate 75. Rear link 106 has one end pivotally connected at 109 to the rear end of lever 107. The other end of link 106 is pivoted on stud 110 carried by support 73. Link 106 has an elongated slot 111 which receives stud 110, the purpose for which will be mentioned later. A spring 112 extending between support 73 and link 106 biases the latter in counterclockwise direction and tends to establish an over-center condition in the upper knuckle assembly.

Front leg 114 of L-shaped front lever 107 lies below and rearwardly of play and record keys 40 and 41. When the mechanism is in stop condition and play key 40 is depressed, a finger 116 (FIG. 6) projecting downwardly from key 40 engages leg 114 and flexes the upper knuckle assembly. When this occurs, bias spring 77 pivots plate 75 in clockwise direction enabling cam roller 85 to engage capstan 35. Thereafter the mechanism shifts into the play function as previously described.

The knuckle assembly also is flexed when record key 41 is depressed. Record key 41 has a depending finger (not shown) similar to finger 116 of play key 40, and this finger of the record key engages and moves an arm 118 which is pivoted on stud 97 of plate 75. Arm 118, in turn, engages and moves front leg 114 of L-shaped front lever 107 and thus flexes the upper knuckle assembly. Spring 77 then pivots plate 75 in clockwise direction and cam roller 85 engages capstan 35 to shift the mechanism into the record function.

*Mechanism responsive to play and record keys for switching amplifier for play and record functions*

The text immediately preceding has described the elements which cooperate in shifting the tape transport mechanism from stop position into the play and record functions, and out of play and record functions to stop position. As a corollary to these controls, means are provided which cooperate therewith in switching the amplifier of the apparatus from neutral, stop condition to the play and record function, and from the play and record functions to the neutral condition. These means now will be described.

Still referring to FIG. 2, an amplifier switch (not shown) has a vertical switch shaft 120 located generally beneath record key 41. A horizontal bar 121 is mounted at its center on the top of shaft 120. An upstanding record pin 122 is located at one end of bar 121 and an upstanding play pin 123 is located at the other end of bar 121.

When switch shaft 120 and associated bar 121 are in the rotational positions shown in FIG. 2, the amplifier switch is in neutral position, that is, the amplifier is not connected either for the play or record functions. When the switch is in this position the amplifier may be connected so it will demagnetize the sound head of the recorder apparatus in accordance with U.S. patent No. 2,682,578. The control mechanism therefore is designed to establish the neutral position of the amplifier switch in a definite, positive manner, as will be seen.

The amplifier is switched into record function by rotating switch shaft 120 and bar 121 through a small angle in counterclockwise direction from the positions shown in FIG. 2. Alternatively, the amplifier is switched into play function by rotating shaft 120 and bar 121 in clockwise direction from the positions shown in FIG. 2. The means for providing such rotation in either direction and the means for bringing about the neutral position now will be described.

The aforesaid arm 118 (which cooperates in shifting the tape transport mechanism into record function) is integral with or connected to a plate 125 which is generally C-shaped and is pivoted on stud 97 of main plate 75. Plate 125 has edges 126 and 127 which are in effective relation, respectively, with record pin 122 and play pin 123 of bar 121. These edges define in part a pair of open ended recesses which cooperate, as will be seen, with pins 122 and 123 in performing the switching functions.

The aforesaid recesses are further defined by small plates 128 and 129 which are mounted adjustably on plate 125 adjacent the edges 126 and 127. Thus, edge 126 and spaced plate 128 define an open ended recess 130 in plate 125 adjacent record pin 122, and edge 127 and spaced plate 129 define an open ended recess 131 adjacent play pin 123. As will be seen, these recesses alternatively embrace the adjacent pins, and subsequent movement of plate 125 in response to clockwise rotation of main plate 75 causes rotation of switch shaft 120 in one direction or the other to actuate the amplifier switch for the play or record function. Plate 125 hereinafter is sometimes called the seventh means of the present control mechanism.

Plate 125 with its open ended recesses 130 and 131 is positioned alternatively with respect to pins 122 and 123 for proper switching action. The proper positioning for switch action in response to play key 40 is provided by a spring 133 which biases plate 125 in clockwise direction so that play pin 123 is embraced by recess 131 when the mechanism is in stop condition, as shown in FIG. 2. Thus, when play key 40 is depressed and main plate 75 rotates in clockwise direction, as previously described, plate 125 moves therewith and rotates bar 121 and switch shaft 120 in clockwise direction. This switches the amplifier into play function, and the elements of the mechanism occupy the positions shown in FIG. 3. It will be noted from this figure that record pin 122 is adjacent small plate 128 so it is impossible for plate 125 to shift inadvertently out of effective relation with play pin 123.

Referring back to FIG. 2, plate 125 must be rotated in counterclockwise direction in order for record pin 122 to be embraced by open ended recess 130 for switching into the record function. This is accomplished by structure previously mentioned. It will be recalled that arm 118 is integral with or connected to plate 125, and that arm 118 is engaged and rotated by the depending finger of record key 41 when the latter is depressed. Thus, plate 125 is rotated in counterclockwise direction and its recess 130 embraces record pin 122 before the upper knuckle assembly is flexed and the mechanism shifts into record function.

When the mechanism shifts into record function, main plate 75 rotates in clockwise direction and imparts switch-actuating movement to plate 125 whereby the amplifier is switched into record function. The elements associated with switch shaft 120 are shown in FIG. 4 in record function. It will be noted that play pin 123 is adjacent plate 129 when the elements are in this position, an arrangement which makes it impossible for spring 133 to pivot plate 125 and thus move the plate from effective relation with record pin 122.

Because plate 125 is rotatable alternatively between play and record positions when the mechanism is in stop condition, it is important that plate 125 be free of any tendency to bind. Also, as previously mentioned, switch shaft 120 must occupy a neutral, central position when the mechanism is in stop condition. A binding tendency is eliminated and the neutral switch position is established by an arrangement which next will be described.

It will be remembered that rear link 106 of the upper knuckle assembly has an elongated slot 111 which receives stud 110. This elongated slot 111 permits main plate 75 to pivot in counterclockwise direction somewhat farther than otherwise would be permitted by the upper knuckle assembly. Cam roller 85 is so located on plate 75 that rotation thereof does pivot plate 75 somewhat beyond the terminal plate position established by the knuckle assembly. This excess rotation of plate 75 insures that edges 126 and 127 of plate 125 bring switch shaft 120 to neutral position. As cam roller 85 is rotated beyond its "high" point, bias spring 77 causes main plate 75 and plate 125 to "back off," thereby avoiding a condition of bind between plate 125 and either of the pins 122 and 123. Thus, plate 125 is free to be shifted with respect to the pins to condition the mechanism for its shift into either play or record function.

*Instant stop control*

In tape recorder apparatus of this type it is desirable to provide an instant stop control which is more or less independent of the major controls and which stops tape travel instantly when the apparatus is in the play or record function. In addition, the original function is resumed immediately on release of the control.

In the form of the invention shown, the instant stop control includes a second or lower knuckle assembly located more or less below the previously described upper knuckle assembly. This lower knuckle assembly comprises rear link 135 and front lever 136. The latter is pivoted, like front lever 107 of the upper knuckle assembly, on stud 108 of main plate 75. Rear link 135 is pivoted at its ends to front lever 136 and to stud 110 of support 73, the connection to stud 110 including an elongated slot like the slot 111 in upper link 106.

Front lever 136 has an arm 137 which is connected by link 138 to element 139 of an instant stop solenoid 140 (FIG. 5). When solenoid 140 is energized, front lever 136 pivots in clockwise direction and thereby tends to straighten out the lower knuckle assembly as shown in FIG. 4. The design of the knuckle assembly is such that when the assembly is straightened out, main plate 75 is thereby rotated through a small angle in counterclockwise direction. Such rotation effects separation of pressure roller 36 from capstan 35, thereby stopping tape drive in an instantaneous manner. When solenoid 140 is deenergized, spring 77 is effective to reestablish the tape-driving relationship between the pressure roller and capstan.

The lower knuckle assembly and its connection to solenoid 140 hereinafter is sometimes called the eighth means of the control mechanism.

One manual control for instant stop solenoid 140 is previously mentioned lever 42 which is located adjacent record key 41 (FIG. 1). Lever 42 actuates a switch which is effective to energize and deenergize solenoid 140. This will be described more fully in connection with FIG. 11.

*Mechanism separating tape from sound head when tape travel is stopped*

When main plate 75 is rotated in counterclockwise direction to separate pressure roller 36 from capstan 35 and thus stop tape travel in response either to the instant stop control (lever 42) or stop key 45, the action is effective to withdraw tape 30 from contact with the sound head so switching "noise" will not be recorded on the tape. The mechanism accomplishing this now will be described.

Referring again to FIG. 2, sound head 150 is located centrally of the apparatus. Movable pressure pads 151 (for erase) and 152 (for record) are mounted in effective relation with and spring biased toward head 150. When the apparatus is in stop condition, pressure pads 151 and 152 are spaced from head 150 as shown in FIG. 2.

Pressure pads 151 and 152 are moved away from head 150 by connection with a plate 153 which is mounted below head 150 and slidable forwardly and rearwardly. A pin 154 projects upwardly from plate 153 and engages an arm 155 which carries pressure pad 152. Arm 155, when withdrawn from sound head 150, engages arm 156 of pressure pad 151, thereby also withdrawing the latter. When plate 153 is moved rearwardly of the apparatus, the bias springs (not shown) of arms 155 and 156 move the pressure pads into engagement with tape 30 to hold same in proper relation with sound head 150 for play or record function.

Sliding plate 153 also carries fingers 157 and 158 which project upwardly on opposite sides of sound head 150. These fingers 157 and 158 move forwardly with plate 153 to separate tape 30 from sound head 150 when the apparatus is in stop condition. They move rearwardly with plate 153, as will be seen, when the apparatus is shifted into the play or record function. The means for moving plate 153 forwardly and rearwardly now will be described.

Sliding plate 153 has mounted thereon a pin or stop element such as peripherally grooved disk 159, and spaced therefrom is a pin 160 mounted on support 73. Between disk 159 and pin 160 is positioned a cam arm 162 which is pivoted at 163 to rear link 135 of the lower knuckle assembly. A spring 165 is connected between cam arm 162 and sliding plate 153.

When the lower knuckle assembly is straightened out as occurs when the mechanism is shifted into stop condition in response either to the instant stop control (FIG. 4) or stop key 45 (FIG. 2), the lower knuckle assembly tends to straighten out and thereby move cam arm 162 to the right. This is effective to slide plate 153 forwardly, thereby separating pressure pads 151 and 152 from sound head 150 and causing fingers 157 and 158 to separate tape 30 from the sound head.

When the mechanism is shifted into play or record function, or instant stop control 42 is released, the lower knuckle assembly is flexed, thereby moving cam arm 162 to the left. When this occurs, spring 165 is effective to slide plate 153 rearwardly, thereby withdrawing fingers 157 and 158 from tape 30 and permitting pressure pads 151 and 152 again to engage tape 30 and sound head 150.

*Rapid rewind and rapid forward control mechanisms*

When the apparatus is operating in the play or record function, actuation of rewind key 46 (FIG. 1) or rapid forward key 47 first is effective to move sliding bar 99 to the right. This, as previously described, unlatches keeper 96 from latch plate 90 and causes the mechanism to shift into stop condition. Also, actuation of rewind key 46 or rapid forward key 47 is effective to energize instant stop solenoid 140 (FIG. 5) in all apparatus functions to insure termination of any slow speed tape travel before rapid speed travel starts.

Figures 11, 12, 13:
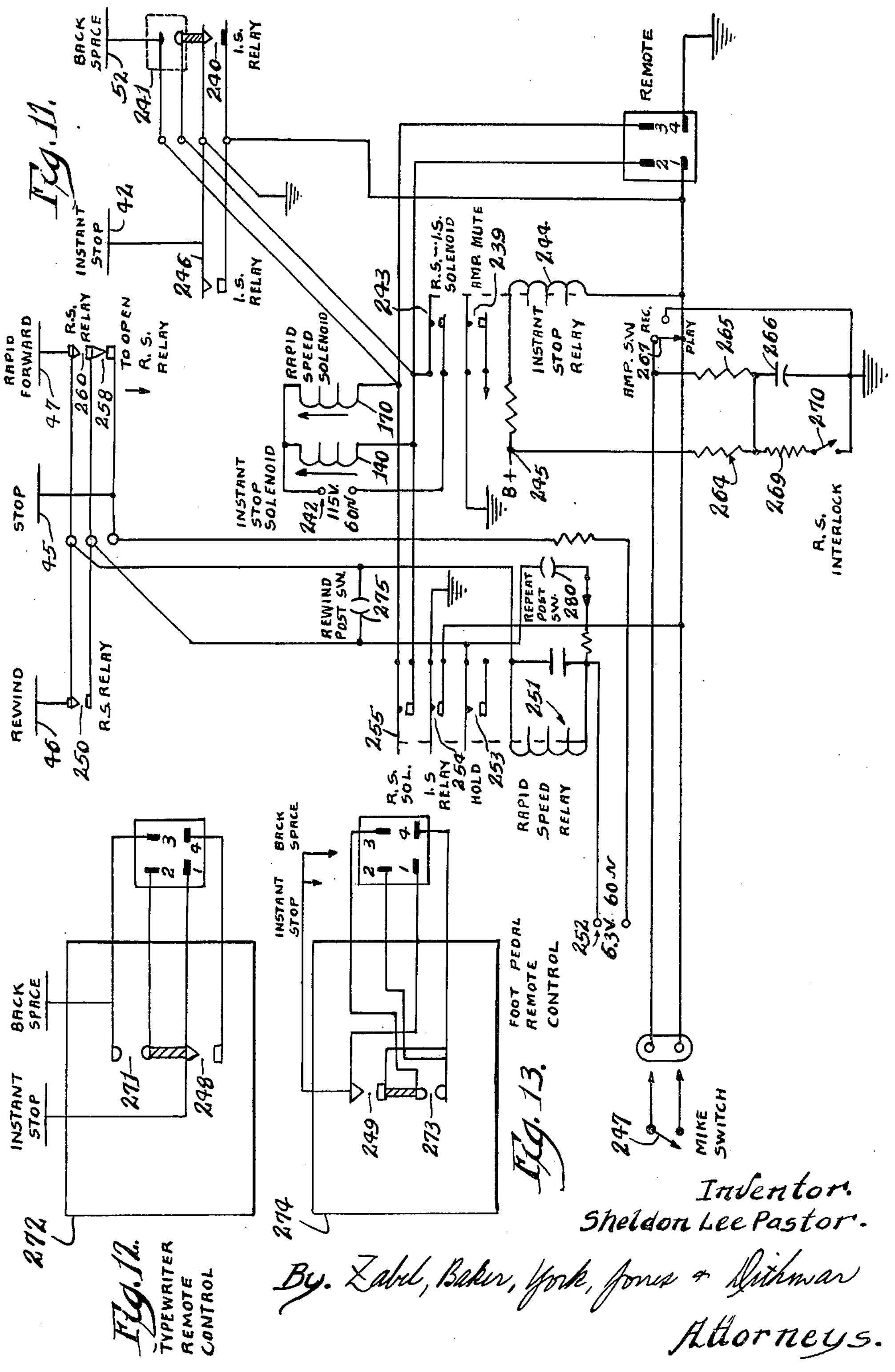
FIG. 11 is a schematic diagram of electrical control circuits of the invention.
FIG. 12 is a schematic diagram of a typewriter remote control circuit which may be used in the invention.
FIG. 13 is a schematic diagram of a foot pedal remote control circuit which may be used in the invention.

The mechanism is shifted into the rapid rewind and rapid forward functions by means of a rapid speed solenoid 170 (FIG. 5) which is actuated by various electrical switches (FIG. 11). Rewind key 46 actuates an associated switch which is effective to energize solenoid 170, and rapid forward key 47 likewise actuates an associated switch which is effective to energize solenoid 170. In addition, backspace key 52 actuates two associated switches which energize instant stop solenoid 140 and rapid speed solenoid 170 to shift the mechanism into the rewind function during the period the backspace key is held depressed.

Before describing the electrical control circuits involving rapid speed solenoid 170, the mechanical elements which cooperate with keys 46 and 47 in shifting the mechanism for the rewind and rapid forward functions first will be described. These elements are effective to condition or sense the apparatus for shifting into the rewind and rapid forward functions so that the functions will be established upon actuation of rapid speed solenoid 170 which, of course, moves in the same direction for both shifts.

Rapid speed solenoid 170, when energized, rotates an arm 171 (upper left in FIGS. 2 and 3) in clockwise direction. A link 172 is pivoted to arm 171 at 173, and the other end of link 172 is pivoted at pin 174 to a long lever 175 which extends from rear to front of the apparatus. Lever 175 is pivoted between its ends to chassis 70, and the front end of the lever is bifurcated as shown at 176. A pin 178 projects upwardly from lever 175 near the rear end of the lever.

As described more fully in the prior U.S. patents mentioned previously, supply spindle 27 projects upwardly from a supply roller 180. This roller 180 is rotatably mounted on arm 181 which is pivoted on upstanding stud 182 of chassis 70. Arm 181 is biased in counterclockwise direction by spring 183 extending between arm 181 and pivot pin 174.

Arm 181 normally is held in a clockwise position by means of a link 184 which is pivoted at pin 174 and extends into contact with a pin 185 carried by arm 181. The free end of link 184 is bifurcated to embrace pin 185. When rapid speed solenoid 170 is energized in response to rewind key 46 to move link 172 to the left, pivot pin 174 and associated link 184 similarly move, thereby enabling spring 183 to move arm 181 in counterclockwise direction. When arm 181 so moves, supply roller 180 is brought into engagement with the periphery of drive motor roller 187 which at all times rotates in counterclockwise direction. Thus, motor roller drives supply roller 180 in counterclockwise direction for the rapid rewind function.

When rapid speed solenoid 170 is deenergized to terminate the rewind function, a return spring 190 connected to rear finger 191 of lever 175 is effective to reset solenoid 170 and the associated elements to the stop positions shown in FIG. 2. The return movement of pivot pin 174 moves link 184 in proper direction to effect separation of supply roller 180 from motor roller 187, thereby stopping rewind drive of the supply roller.

The shift into the rapid forward function in response to rapid forward key 47 is accomplished by means of a sensing element 195 and related members which now will be described.

Takeup spindle 28 is mounted on a take-up roller 196 which in the play and record functions is driven through a friction clutch from a belt connection with the shaft of a continuously rotating flywheel 197 shown in dotted line in FIG. 3. Capstan 35, incidentally, is an extension of the shaft of this flywheel.

An idler roller 200 located adjacent take-up roller 196 is slidably mounted on support 73. A portion 201 of the slidable bearing for idler roller 200 has a pin 202 which projects through an elongated slot 203 in a link 204. A bias spring 205 extends between pin 202 and a point on link 204. This spring serves to bias idler roller 200 into engagement with takeup roller 196 and flywheel 197 during the rapid forward drive function. An opposing bias spring 206 extends between bearing portion 201 and a stud 207 on chassis 70, and this spring is effective to keep idler roller 200 out of such engagement except during the rapid forward drive function.

The opposite end of link 204 engages pivot pin 210 to which is pivoted one end of sensing member 195 and one end of a lever 211 which also is pivoted on stud 212 of chassis 70. As will be seen, when sensing member 195 is moved to the left by solenoid 170 for rapid forward drive, pivot pin 210 and link 204 also move to the left. This movement brings idler roller 200 into engagement with takeup roller 196 and flywheel 197 to establish rapid forward drive of takeup reel 26.

In order for solenoid 170 to move sensing member 195 to the left, means are provided for rotating member 195 in clockwise direction on its pivot pin 210. By so rotating sensing member 195, edge 215 thereof is brought into effective relation with pin 178 of lever 175. Thus, when solenoid 170 pivots lever 175 in counterclockwise direction, pin 178 moves sensing member 195 to the left. This, as described above, is effective to establish rapid forward drive.

Sensing member 195 is rotated in clockwise direction before actuation of the switch which is effective to energize rapid speed solenoid 170. This rotation is produced when rapid forward key 47 is depressed. The stem of rapid forward key 47 is designated 220 in FIGS. 2 and 8. A pin 221 projects rearwardly from stem 220 and engages arm 222 of a crank 223 carried by a bracket 224 mounted on support 73. A finger 219 projects downwardly from crank 223 and engages a bar 225 which extends from front to rear of the apparatus. When rapid forward key 47 is depressed, bar 225 moves rearwardly.

Rear end 226 of bar 225 is located adjacent a spring biased lost motion finger 227 mounted on sensing member 195. Thus, when bar 225 moves rearwardly, it engages finger 227 and rotates both finger 227 and sensing member 195 in clockwise direction to bring edge 215 of member 195 into effective relation with pin 178. When solenoid 170 is actuated in response to rapid forward key 47, pin 178 moves sensing member 195 to the left, thereby establishing rapid forward drive as previously described.

Rapid speed solenoid 170 is deenergized to conclude the rapid forward drive function, and return spring 190 serves to move various of the related elements to the stop position shown in FIG. 2. However, separate means are provided for rotating sensing member 195 in counterclockwise direction to the stop position shown in FIG. 2. This means comprises a lever 230 (upper left in FIG. 2) which is pivoted on an upstanding stud 231 carried by chassis 70. A spring 232 biases lever 230 in clockwise direction. Lever 230 has a finger 233 which engages sensing member 195 and biases the member in counterclockwise direction. This finger 233 returns sensing member 195 to the stop position at the end of the rapid forward drive function.

Lever 230, just described, has a second function, namely, it keeps supply roller 180 out of rewind engagement with motor roller 187 during rapid forward function. The left leg of lever 230 terminates in a projection 234 which is in effective relation with arm 181 of supply roller 180. When lever 230 is rotated in counterclockwise direction by sensing member 195 at the start of the shift into rapid forward function, projection 234 moves to a latching position and serves to latch arm 181 so supply roller 180 will not engage motor roller 187, as it otherwise would do on actuation of rapid speed solenoid 170.

Referring again to lever 175 which extends from rear to front of the apparatus, the bifurcated front end 176 thereof connects with and actuates a plate 235 (FIGS. 2, 3, 4 and 7) which slides back and forth along the front of the apparatus. When lever 175 is in counterclockwise position during either rapid speed function (rewind or rapid forward), plate 235 is positioned to the right where stops 236 and 237 respectively prevent improper actuation of play and record keys 40 and 41.

*Instant backspace control*

The backspace function of the apparatus is controlled by backspace key 52 (FIG. 1), previously mentioned. While the backspace function may be started with the apparatus in stop condition, it is more usual to employ the function when the apparatus is in play or record function. The backspace feature, of course, enhances the usefulness of the apparatus as a dictating machine, and it also facilitates tape indexing and editing.

Speaking generally, actuation of backspace bar 52 first is effective to energize instant stop solenoid 140 and cause the mechanism to shift into instant stop condition. This, of course, separates pressure roller 36 from capstan 35 and stops tape travel instantly. Simultaneously with the shift into instant stop condition, actuation of backspace bar 52 closes a switch which is effective to energize rapid speed solenoid 170 and thereby shift the mechanism into rewind function, as previously described. This function continues until backspace bar 52 is released, at which time the switch is opened to deenergize rapid speed solenoid 170 and thereby conclude rewind drive.

When solenoid 170 is energized and moves associated lever 175 in counterclockwise direction, a link 282 which is connected to lever 175 at pin 178 is moved to the left. Link 282, when so moved, lowers a sliding plate 283 which disengages the clutch of takeup roller 196, thereby removing the forward drive torque from the roller. Sliding plate 283 otherwise is moved by main plate 75 to which it is connected at stud 108. The clutch of takeup roller 196 is engaged by the action of sliding plate 283 when main plate 75 is in play or record function and disengaged when in stop condition or in main rewind or rapid forward function.

If the apparatus is in play function when backspace bar 52 is actuated, the apparatus resumes play function when backspace bar 52 is released. Thus it is possible to note from the tape signals the precise position to which the backspace control returned the tape.

As will be described more fully in connection with the electrical circuits (FIG. 11), an automatic time delay is provided in backspace between the termination of rewind drive and the resumption of slow speed drive in play function. This time delay insures proper deceleration of the tape from rewind high speed drive to a condition of stop and thus avoids tape breaking or distortion when slow speed forward drive is resumed in play function.

On the other hand, if the apparatus is in record function when backspace key 52 is actuated, the backspace control is such as to shift the mechanism out of the record function so that the mechanism will be in stop condition when backspace bar 52 is released to terminate the backspace function. This, of course, avoids unwanted erasure of signals on the tape.

The aforesaid shift into stop condition during backspace in record function is effected by means of engagement between sliding bar 235 (which moves to the right with the shift into rewind) and free end 105 of arm 103, as previously mentioned. Movement of arm 103 unlatches keeper 96 from latch plate 90, thereby permitting latch plate 90 to move cam roller 85 into engagement with capstan 35 and shifting the mechanism into stop condition.

Referring to FIGS. 2, 3 and 4 (front portions), backspace bar 52 actuates a switch generally designated 240. This switch has spaced contacts which are closed to effect energization of instant solenoid 140. Below switch 240 is a switch 241 which also is actuated by backspace bar 52 more or less simultaneously with switch 240. As mentioned, switch 241, when closed, energizes rapid speed solenoid 170 to shift the mechanism into the rewind function.

Switch 241, as will be seen from FIG. 11, is in direct circuit (that is, there is no intermediate relay switch) with rapid speed solenoid 170. Thus, solenoid 170 is energized when switch 241 is closed, and deenergized when the switch is opened.

*General description of brakes*

The brakes illustrated in the present apparatus are similar to those shown and claimed in previously mentioned U.S. Patent No. 2,877,958, dated March 17, 1959.

Referring to FIGS. 2–4, there are shown a left brake assembly 285 pivoted on stud 182 and a right brake assembly 286 pivoted on stud 212. A brake spring 287 extends between the two brake assemblies and biases them toward brake-applied position. The two brake assemblies respectively have brake elements 290 and 291 which engage supply roller 180 and takeup roller 196 when in brake-applied position.

Means are provided for disengaging the brake elements when the apparatus shifts into either rewind or rapid forward function, and these means now will be described. Left brake assembly 285 has a pin 295 which extends downwardly into effective relation with finger 191 of lever 175. A link 296 extends between right brake assembly 286 and pin 178 of lever 175. Thus, when lever 175 moves in counterclockwise direction in response to action of rapid speed solenoid 170, finger 191 engages pin 295 of left brake assembly 285, thereby releasing left brake element 290 from supply roller 180. Simultaneously, pin 178 of lever 175 moves link 296 to the left, thereby releasing brake element 291 from take-up roller 196.

When rapid speed solenoid 170 is deenergized, lever 175 moves in clockwise direction to stop position and bias spring 287 is permitted to apply both brake elements to the respective tape rollers.

Means also are provided for releasing the brake elements at the start of the play and record functions and for applying the brakes during full stop and instant stop conditions. This means, as illustrated, comprises a sliding plate 300 which extends generally from front to rear of the apparatus. Plate 300 is pivoted at the front to stud 108 of main plate 75, and at the rear it terminates with flange 301 in effective relation with brake assemblies 285 and 286. When the mechanism shifts into play or record function, plate 75 rotates in clockwise direction, as previously described. This rotation causes sliding plate 300 to move rearwardly, bringing flange 301 into engagement with the brake assemblies and relasing the brake elements, as shown in FIG. 3 (play function). In FIG. 2 (full stop condition), flange 301 is withdrawn from brake assemblies 285 and 286 and the brake elements 290 and 291 are applied in response to the action of bias spring 287.

When the mechanism is shifted into instant stop in response to any of the several instant stop controls, plate 75 rotates through a small angle in counterclockwise direction. This rotation is effective to withdraw flange 301 from the brake assemblies whereby the brake elements are applied, as shown in FIG. 4.

The action of the brake assemblies during backspace is a combination of the actions in rewind function and instant stop. When backspace is initiated with the apparatus in play function, it will be remembered that there is a time delay between the termination of rewind and resumption of play function. During this time delay the mechanism is in instant stop condition. Thus, when the brake assemblies are released by solenoid 170 at the end of backspace rewind, the brake elements remain applied to decelerate tape travel due to the condition of instant stop then existing. Following the time delay and termination of instant stop, plate 75 shifts into play function, causing sliding plate 300 to move rearwardly and release the brake elements for resumption of play function.

Sliding plate 300 has a flange 302 in effective relation with arm 162 which influences movement of sliding plate 153. As the mechanism moves into full stop condition (FIG. 2), flange 302 engages arm 162 and moves same forwardly. This, in turn, moves sliding plate 153 forwardly and provides maximum withdrawal of pressure pads 151 and 152 to afford easy tape threading. The movement of plate 300 is somewhat less in response to instant stop, and in this condition flange 302 does not engage arm 162 (FIG. 4).

*Electrical control circuits*

Examples of electrical control circuits used in the invention are shown schematically in FIGS. 11–13. Many of the circuit components have been mentioned previously, at least from the functional standpoint. Legends are used in FIGS. 11–13 to make the circuit diagrams more or less self-explanatory when considered in connection with the previous description.

(*a*) *Instant stop circuits*

As illustrated in FIG. 11, instant stop solenoid 140 is energized by line voltage applied to terminals 242. Solenoid 140 is in circuit with relay switch 243 which is actuated by an instant stop relay coil 244. As shown, relay coil 244 is energized by direct current applied between terminal 245 and ground.

Relay coil 244 also actuates a switch 239 which when closed mutes the amplifier to avoid switching noise in the play or record circuits.

Several manual switches are provided to energize and deenergize instant stop relay coil 244. One is backspace switch 240, previously mentioned. Another is switch 246 which is actuated by instant stop lever 42. Another is remote instant stop switch 247 mounted on a microphone (not shown). Switch 247 operates only in record function when amplifier switch 267 connects it in circuit. Others are typewriter remote control instant stop switch 248 (FIG. 12) and foot pedal remote control switch 249 (FIG. 13).

Closure of any one of these manual switches energizes instant stop relay coil 244 and closes relay switch 243 to energize instant stop solenoid 140 and shift the mechanism into instant stop condition. Release of any one of these switches deenergizes relay coil 244 to open switch 243 and deenergize instant stop solenoid 140, after which forward drive in the play or record function is resumed. Resistances 265 and 264 are proportioned so as to prevent the discharge of capacitance 266 sufficiently to delay the resumption of forward drive in play when an instant stop switch is released.

*(b) Rewind and rapid forward circuits*

Rewind key 46 and rapid forward key 47 which initiate the respective functions are shown diagrammatically at the top of FIG. 11.

When rewind key 46 is depressed manually, an associated switch 250 is closed. This energizes a rapid speed relay coil 251 which is connected to a low voltage source 252. When energized, relay coil 251 closes associated switches 253, 254 and 255.

Switch 253 establishes a "hold" circuit which maintains relay coil 251 energized following release of rewind key 46 and the opening of switch 250.

Switch 254 energizes instant stop relay coil 244 which in turn closes associated switch 243 and energizes instant stop solenoid 140.

Switch 255 in series with then closed switch 243 is effective to energize rapid speed solenoid 170. When the latter is energized, the mechanism shifts into the rewind function as previously described.

The manually-initiated rewind function is terminated by depressing stop key 45. This opens associated switch 258 which deenergizes rapid speed relay coil 251 and opens its three associated switches. As a result, rapid speed solenoid 170, instant stop relay coil 244 and instant stop solenoid 140 are deenergized to terminate the rewind function.

The rapid forward function is initiated by depressing rapid forward key 47 manually. This closes associated switch 260 and energizes rapid speed relay coil 251 to close switches 253, 254 and 255. Rapid speed solenoid 170 is energized, together with instant stop relay coil 244 and instant stop solenoid 140, as in the case of rewind. Switch 253 establishes the hold circuit so it is unnecessary to keep rapid forward key 47 depressed manually.

The rapid forward function is terminated by depressing stop key 45 which opens associated switch 258 to deenergize the various relay coils and solenoids.

*(c) Backspace circuits*

Backspace bar 52 is shown diagrammatically at the upper right in FIG. 11. It will be recalled that bar 52 is maintained depressed during the period in which the backspace function is desired.

When backspace bar 52 is depressed, associated switch 240 first is closed. This energizes instant stop relay coil 244 which closes switch 243 and energizes instant stop solenoid 140, thereby stopping forward tape drive instantly if the apparatus is in the play or record function. The action of backspace bar 52 also closes switch 241 which energizes rapid speed solenoid 170 directly from line terminals 242 through a circuit including then-closed switch 243.

When the backspace function is initiated with the mechanism in the record function, release of bar 52 opens switches 240 and 241. This immediately deenergizes instant stop relay coil 244 and rapid speed solenoid 170, thereby terminating the backspace function. As mentioned previously, the mechanism shifted into stop condition at the start of backspace due to engagement between sliding bar 235 and free end 105 of arm 103 (FIG. 4), so backspace which was initiated with the mechanism in the record function terminates with the mechanism in stop condition.

The action is somewhat different when backspace is initiated with the mechanism in play function. In this circumstance, there is a time delay following termination of backspace rewind after which the apparatus resumes the play function. The purpose of this time delay, as previously mentioned, is to permit the tape to decelerate from rapid rewind drive to stop condition before resumption of the tape drive in the forward play direction.

This time delay is provided by a resistance-capacitance circuit including resistance 265 and capacitance 266 which are connected in series between ground and amplifier switch 267. The latter is shown connected in play position in FIG. 11.

Capacitance 266 is shunted by resistance 269 and a rapid speed interlock switch 270. The latter is actuated by sliding bar 235 which moves to the right during the rewind function, the switch 270 being closed when bar 235 moves to the right. Capacitance 266 is discharged to ground through this closed switch 270 and current limiting resistance 269, when the tape is rewinding during the backspace function.

At the conclusion of the rewind function in backspace, the mechanism shifts out of rewind and opens interlock switch 270. Even though bar-actuated switch 240 is opened when backspace bar 52 is released, instant stop relay coil 244 is not deenergized immediately. Rather, coil 244 remains energized during the time period required for charging capacitance 266 through the illustrated resistances, particularly resistance 264 and the relay coil. When the capacitance is charged, relay coil 244 deenergizes to open switch 243 and thereby deenergize instant stop solenoid 140.

The backspace function also may be controlled by switch 271 (FIG. 12) in typewriter remote control unit and by switch 273 (FIG. 13) in foot pedal remote control unit 274.

*(d) Automatic rewind circuit*

The automatic rewind feature of the apparatus is controlled by switch 275 which physically may form a part of rewind post 60. The previously mentioned terminals of switch 275 are bridged by a conducting tab secured to tape 30 at the point where automatic rewind is to commence. Closure of this switch energizes rapid speed relay coil 251 by a circuit which includes then closed stop switch 258.

As mentioned, if automatic rewind is not desired in the case of a tape having a conducting tab, the tape simply is threaded behind rewind post 60.

*(e) Automatic repeat circuit*

This circuit, effective at the conclusion of automatic rewind is controlled by switch 280 which physically may be mounted on repeat post 55. The terminals of this switch are bridged by a conducting tab secured to tape 30 at the point where repeat is to begin. Closure of switch 280 lowers the voltage across rapid speed relay coil 251 causing switches 253, 254 and 255 to open, thereby terminating rewind drive and shifting the apparatus into play function, as at the conclusion of backspace when the latter is initiated with the apparatus in play function.

Action of switch 280 may be overridden if desired, by manually depressing rewind key 46.

*(f) Stop circuit*

The apparatus is shifted to stop condition from any function by depressing stop key 45. This opens associated switch 258 which deenergizes any energized component except while backspace bar 52 is held depressed. Such components, however, are deenergized on release of bar 52.

From the above description it is thought that the construction and advantages of this invention will be readily apparent to those skilled in the art. Various changes in detail may be made without departing from the spirit or losing the advantages of the invention.

Having thus described the invention, what I claim as new and desire to secure by Letters Patent is:

1. In a tape recorder having a rotating capstan and a pressure roller movable into and out of engagement therewith for starting, maintaining and stopping forward tape drive, the combination comprising a support, a first means movable with respect to said support and carrying said pressure roller in effective relation with said capstan, bias means urging said pressure roller toward said capstan, a movable second means in close proximity to said capstan, said second means comprising a circular member mounted for rotation on said first means, the axis of rotation of said circular member being off-center, said second means engageable with said capstan and driven thereby both to permit said pressure roller gently to engage said capstan in response to said bias means and to provide energy separating said pressure roller from said capstan in opposition to said bias means, a third means effecting engagement of said second means with said capstan to produce engagement of said pressure roller with said capstan, and a fourth means effecting engagement of said second means with said capstan to produce separation of said pressure roller and capstan.

2. The combination of claim 1 wherein said first means comprises a plate member pivoted to said support and said bias means comprises a spring connected between said plate member and said support.

3. The combination of claim 1 with the addition of resilient means cushioning engagement of said second means with said capstan.

4. The combination of claim 1 wherein said circular member and said pressure roller have a common axis of rotation, and means whereby said pressure roller tends to impart rotary movement to said circular member.

5. The combination of claim 1 with the addition of a fifth means limiting the position of said movable second means after the latter has functioned to separate said pressure roller from said capstan, said position such that a portion of said movable second means is immediately adjacent said capstan.

6. The combination of claim 5 wherein said fifth means comprises cooperating means on said first and second means providing a stop, said stop yieldable in response to a predetermined driving force applied to said second means.

7. The combination of claim 6 wherein said cooperating means comprises a pin and a yieldable spring in engagement therewith.

8. The combination of claim 1 with the addition of a sixth means limiting the position of said movable second means after the latter has functioned to permit said pressure roller gently to engage said capstan, said position such that a portion of said movable second means is immediately adjacent said capstan.

9. The combination of claim 8 wherein said sixth means comprises a latch plate pivotally mounted on said first means and a cooperating pin on said second means, engagement of said pin with said latch plate providing a stop for said second means.

10. The combination of claim 9 wherein said pivoted latch plate is biased in a direction to rotate said plate and release said pin, and with the addition of releasable keeper means maintaining said latch plate in pin-stopping position.

11. The combination of claim 10 with the addition of a fixed portion of said support engageable by said latch plate whereby said latch plate is latched by said keeper means when said first means is pivoted by said second means to disengage said pressure roller from said capstan.

12. The combination of claim 10 with the addition of means on said latch plate engaging said pin as said latch plate is pivoted in response to its bias after release of said keeper means whereby said second means is caused positively to move into engagement with said capstan.

13. The combination of claim 10 wherein said fourth means includes means engageable with said keeper means to release same on actuation of said fourth means.

14. The combination of claim 1 wherein said fourth means includes a depressible key and means actuated thereby in response to mere triggering pressure to move said second means into engagement with said capstan whereby the latter drives the former to pivot said first means and said pressure roller away from said capstan.

15. The combination of claim 1 wherein said third means includes a control responsive to mere triggering pressure.

16. The combination of claim 15 wherein said control comprises a manually movable member and a first over-center knuckle assembly actuated thereby, said over-center knuckle assembly connected between said support and said first means, said movable member effective to break said knuckle to enable said bias means to pivot said first means and move said second means into engagement with said capstan.

17. The combination of claim 1 with the addition of a sound head and cooperating pressure pads, and means connected to said first means for releasing said pressure pads and separating the tape from said sound head when said first means is pivoted to separate said pressure roller and said capstan.

18. In a tape recorder having an amplifier, a rotary amplifier switch shaft with a record position, a central neutral position and a play position, the combination comprising a support, a first means pivoted with respect to said support for movement in one direction to initiate tape drive for record and play and in the other direction to stop tape drive, a head member on said switch shaft, spaced means on said head member for rotating said switch shaft to the various shaft positions, and a movable seventh means connected between said first means and said spaced means whereby movement of said first means in said one direction actuates said seventh means to rotate said switch shaft in predetermined direction and movement of said first means in said other direction rotates said switch shaft to central neutral position.

19. The combination of claim 18 wherein said seventh means comprises a member pivoted to said first means, said member having a pair of open ended recesses in effective relation with said spaced means on said shaft head member, said open ended recesses positioned to embrace said spaced means alternatively depending on the pivoted position of said member, whereby when said first means pivots in the direction to initiate tape drive said seventh means is effective to rotate said switch shaft in a direction depending on which spaced means is embraced by the associated open ended recess in said member.

20. The combination of claim 19 wherein when said switch shaft is in record or play position a portion of said seventh means lies adjacent the non-embraced spaced means on said shaft head member whereby said seventh means is locked in relation to the embraced spaced means.

21. The combination of claim 19 with the addition of bias means urging said pivoted seventh means in a direction whereby the spaced means of said shaft head member effective to rotate said switch shaft to play position is embraced by its associated open ended recess.

22. The combination of claim 18 wherein when said first means pivots in said other direction to stop tape drive said seventh means engages first one and then both of said spaced means on said shaft head member to rotate said switch shaft to central neutral position.

23. The combination of claim 22 with the addition of second means rotating said first means in said other direction to stop tape drive, said second means effective to move said seventh means against both said spaced means on said shaft head member with substantial pressure and then retract said seventh means slightly with respect to said spaced means to permit said seventh means to be moved easily with respect to said spaced means.

24. The combination of claim 18 with the addition of a manual member engageable with said movable seventh means to position same whereby said seventh means is effective to rotate said switch shaft to record position when said first means is pivoted in direction to initiate tape drive.

25. In a tape recorder having a rotating capstan and a pressure roller movable into and out of engagement therewith for starting, maintaining and stopping tape drive, the combination comprising a support, a first means pivoted with respect to said support and carrying said pressure roller in effective relation with said capstan, bias means urging said pressure roller toward said capstan, an instant stop solenoid, an instant stop switch in circuit with said solenoid, said solenoid energized when said switch is closed, and an eighth means responsive to said solenoid, said eighth means connected between said support and said first means and to said solenoid and effective, when said solenoid is energized, to effect separation of said pressure roller from said capstan to stop tape drive and, when said solenoid is deenergized, to permit engagement of said capstan by said pressure roller to start tape drive.

26. The combination of claim 25 wherein said eighth means comprises a knuckle assembly of two links pivoted together, one of said links connected to said instant stop solenoid.

27. The combination of claim 25 with the addition of a sound head and cooperating pressure pads and means connected to said eighth means for releasing said pressure pads and separating the tape from said sound head when said eighth means is actuated by said instant stop solenoid to separate said pressure roller from said capstan.

28. The combination of claim 25 with the addition of a manual control effective to shift the recorder into record condition and manually movable interlock means normally effective to block actuation of said manual control and movable to permit actuation of said manual control, said instant stop switch responsive to movement of said interlock means whereby said instant stop switch is closed when said interlock means is moved to permit actuation of said manual control.

29. In a tape recorder having a rotating capstan and a pressure roller movable into and out of engagement therewith for starting, maintaining and stopping forward tape drive, the combination comprising a support, a first means pivoted with respect to said support and carrying said pressure roller in effective relation with said capstan, bias means urging said pressure roller toward said capstan, and an instant backspace mechanism including a manual control, an instant stop switch actuated by said manual control, an instant stop solenoid energized when said instant stop switch is closed, an eighth means responsive to said solenoid and effective to move said first means whereby said pressure roller separates from said capstan to stop tape drive instantly, a rewind drive mechanism and control therefor, said control actuated by said manual control after actuation of said instant stop switch whereby the tape is driven in rewind direction, release of said manual control effective first to terminate rewind drive and thereafter denergize said instant stop solenoid.

30. The combination of claim 29 with the addition of means providing a time delay between the termination of rewind drive and deenergization of said instant stop solenoid whereby the tape is permitted to decelerate to stop condition before resumption of forward drive.

31. The combination of claim 30 wherein said time delay means includes resistance and capacitance in effective circuit with said instant stop solenoid and means discharging said capacitance during operation of said rewind drive mechanism.

32. The combination of claim 29 with the addition of means responsive to said manual control, when said control is actuated with the tape recorder in record function, for shifting the tape recorder out of record function whereby the backspace function terminates with the tape recorder in stop condition.

33. In a tape recorder, a rewind drive mechanism and a control therefor, a rapid forward drive mechanism and a control therefor, a rapid speed solenoid responsive to both said controls to actuate the associated drive mechanisms, and sensing means actuated by said control for said rapid forward drive mechanism whereby said rapid speed solenoid in effect discriminates between the said two controls.

34. In a tape recorder, a rewind drive mechanism and a control therefor, a rapid forward drive mechanism and a control therefor, a rapid speed solenoid responsive to both said controls to actuate the associated drive mechanisms, and sensing means actuated by one of said controls whereby said rapid speed solenoid in effect discriminates between the said two controls.

References Cited by the Examiner

UNITED STATES PATENTS

| | | | |
|---|---|---|---|
| 2,013,109 | 9/1935 | Reynolds | 226—181 |
| 2,732,060 | 1/1956 | Zaueruha | 226—181 |
| 2,751,438 | 6/1956 | Baer | 179—100.2 |
| 2,768,244 | 10/1956 | Tiger | 179—100.2 |
| 2,768,795 | 10/1956 | Norton | 242—55.12 |
| 2,813,686 | 11/1957 | Schroter | 242—55.12 |
| 2,952,746 | 9/1960 | Sampson. | |

IRVING L. SRAGOW, *Primary Examiner.*

STEPHEN W. CAPELLI, BERNARD KONICK, *Examiners.*